US012572383B2

(12) United States Patent
Nandakumaran et al.

(10) Patent No.: US 12,572,383 B2
(45) Date of Patent: Mar. 10, 2026

(54) REPORT REEXECUTION FRAMEWORK

(71) Applicant: SAP SE, Walldorf (DE)

(72) Inventors: Ramya Nandakumaran, Chennai (IN);
Sateesh Babu Chilamakuri, Tirupati
(IN); Sathya G, Kochi (IN)

(73) Assignee: SAP SE, Walldorf (DE)

( * ) Notice: Subject to any disclaimer, the term of this
patent is extended or adjusted under 35
U.S.C. 154(b) by 601 days.

(21) Appl. No.: 18/082,447

(22) Filed: Dec. 15, 2022

(65) Prior Publication Data

US 2024/0202023 A1     Jun. 20, 2024

(51) Int. Cl.
G06F 9/48        (2006.01)
G06F 11/07       (2006.01)
G06F 11/14       (2006.01)
G06F 11/30       (2006.01)

(52) U.S. Cl.
CPC ........ G06F 9/4881 (2013.01); G06F 11/0793
(2013.01); G06F 11/1402 (2013.01); G06F
11/3051 (2013.01); G06F 11/3065 (2013.01)

(58) Field of Classification Search
None
See application file for complete search history.

(56) References Cited

U.S. PATENT DOCUMENTS

2018/0341521 A1    11/2018   Crouse et al.
2023/0029198 A1*    1/2023   Guevin .................. H04L 67/10

FOREIGN PATENT DOCUMENTS

CN        104021044         5/2017

OTHER PUBLICATIONS

European Search Report received in European patent application
No. 23209992.9-1203, dated Apr. 24, 2024, 9 pages.

* cited by examiner

*Primary Examiner* — Qing Yuan Wu
(74) *Attorney, Agent, or Firm* — Klarquist Sparkman,
LLP

(57)        ABSTRACT
The present disclosure provides techniques and solutions for
analyzing failed computing tasks (or "jobs") for resubmis-
sion. Computing jobs can include requests to generate
recurring reports according to a schedule. Information
regarding failed jobs can be submitted to a job resubmission
framework. Various parameters can be extracted from the
failed job information and used to determine whether a job
should be submitted for reexecution. Jobs that are to be
submitted for reexecution can be placed in a queue or
released according to a schedule. Determining whether a job
should be submitted for reexecution can include determining
a relative priority of reexecuting a particular job compared
with other jobs to be reexecuted. Disclosed techniques can
help ensure that more important jobs are executed before
lower priority jobs, as well as helping to avoid overloading
a computing system with job reexecution processes.

20 Claims, 7 Drawing Sheets

400

Receive first job failure information for a first execution instance of a first
scheduled job, the first scheduled job being periodically reexecuted according to
a first schedule                                                         410

Parse the first job failure information to obtain a first set of values for a first set
of one or more job parameters                                          420

Determine that the first execution instance of the first scheduled job is to be
resubmitted for execution                                              430

Cause the first execution instance of the first scheduled job to be reexecuted
440

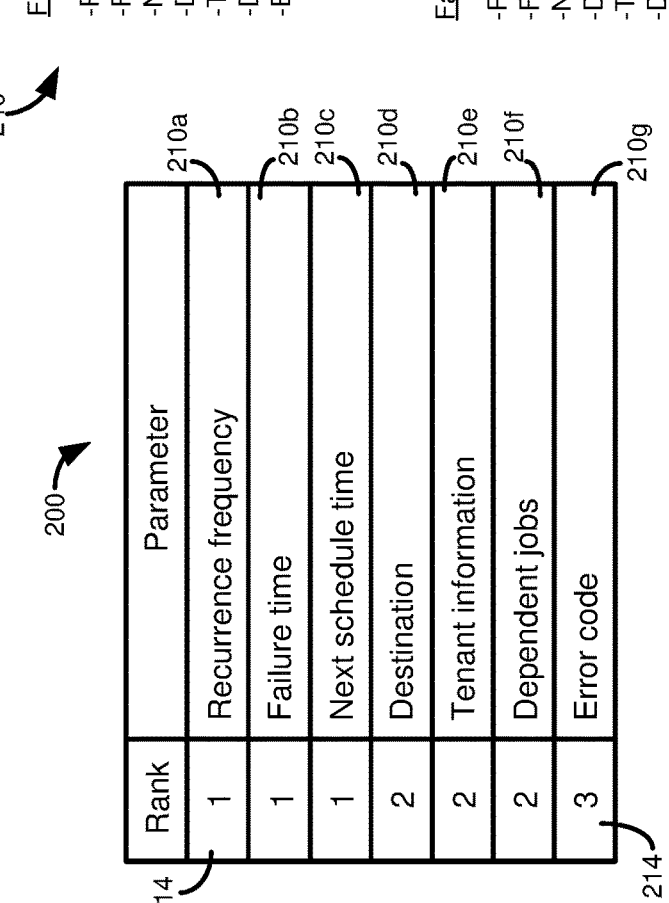

Failed job instance 1 details:

-Recurrence duration (SI_RECURRENCE_DURATION): Every 10 hours.
-Failure Time (SI_FAILURE_TIME): 12:00 am-
-Next schedule time (SI_NEXT_SCHEDULE_TIME): 9 pm
-Destination (SI_DESTINATION): Admin group-
-Tenant (SI_TENANT): BOE-1
-Dependency (SI_DEPENDENT_JOBS): No dependent jobs
-Error code (SI_ERROR_CODE): 2023– Job server un-availability Failed job instance 2 details:

-Recurrence duration (SI_RECURRENCE_DURATION): Every 1 hour
-Failure Time (SI_FAILURE_TIME): 12.15 am
-Next schedule time (SI_NEXT_SCHEDULE_TIME): 1.30 am
-Destination (SI_DESTINATION): Admin group
-Tenant (SI_TENANT): BOE-1
-Dependency (SI_DEPENDENT_JOBS): Yes, has dependent jobs
-Error code (SI_ERROR_CODE): 2023 – Job server un-availability

260

240

200

| Rank | Parameter | |
|------|-----------|---|
| 1 | Recurrence frequency | 210a |
| 1 | Failure time | 210b |
| 1 | Next schedule time | 210c |
| 2 | Destination | 210d |
| 2 | Tenant information | 210e |
| 2 | Dependent jobs | 210f |
| 3 | Error code | 210g |

| Instance Details: Report XYZ | |
|---|---|
| Title: | XYZ |
| Type: | Reporting Software_1 v.1.1 |
| Status: | Failed |
| External Destination: | File copy the instance with the file name: "" to the folder: "C:/ramya". |
| Created By: | Administrator |
| Server Used: | Server1 |
| PID: | 12612 |
| Creation Time: | 11:18:2023 7:17am |
| Expiry: | 11/18/2023 9:16am |
| Start Time: | 11/18/2023 7:17am |
| End Time: | 11/18/2023 7:18am |
| Error Message: | Destination disabled. [Reporting_Software.DiskUnmanaged]: []. Please note the name of the job server used for your request and contact your system administrator to make sure the specified destination is enabled. (FWB 00031) |

320

Re-Execution Scheduling: Report XYZ

JobID: 7483
Retries Allowed: 4
Retries Attempted: 1
Retry Interval: 1800
Schedule Now: False
Schedule Time: 8:17am
Submitter: Administrator

| Instance Details: Dashboard ABC | |
|---|---|
| Title: | XYZ |
| Type: | Web Reporting |
| Status: | Failed |
| External Destination: | File copy the instance with the file name: "MNO" to the folder: "C:/ramya". |
| Created By: | Administrator |
| Server Used: | Server2 |
| PID: | 360 |
| Creation Time: | 11:18:2023 7:17am |
| Expiry: | 11/18/2023 9:16am |
| Start Time: | 11/18/2023 7:17am |
| End Time: | 11/18/2023 7:18am |
| Error Message: | [The following database occurred: (CS) "Specified network layer is invalid: SQlite". For information about this error, please refer to SAP Knowledge Base Article 2054721. (IES 10901)] |

370

| Re-Execution Scheduling: Dashboard ABC |
|---|
| JobID: 7483 |
| PID: 360 |
| Retries Allowed: 2 |
| Retries Attempted: 0 |
| Retry Interval: 1800 |
| Schedule Now: False |
| Schedule Time: 8:17am |
| Submitter: Administrator |

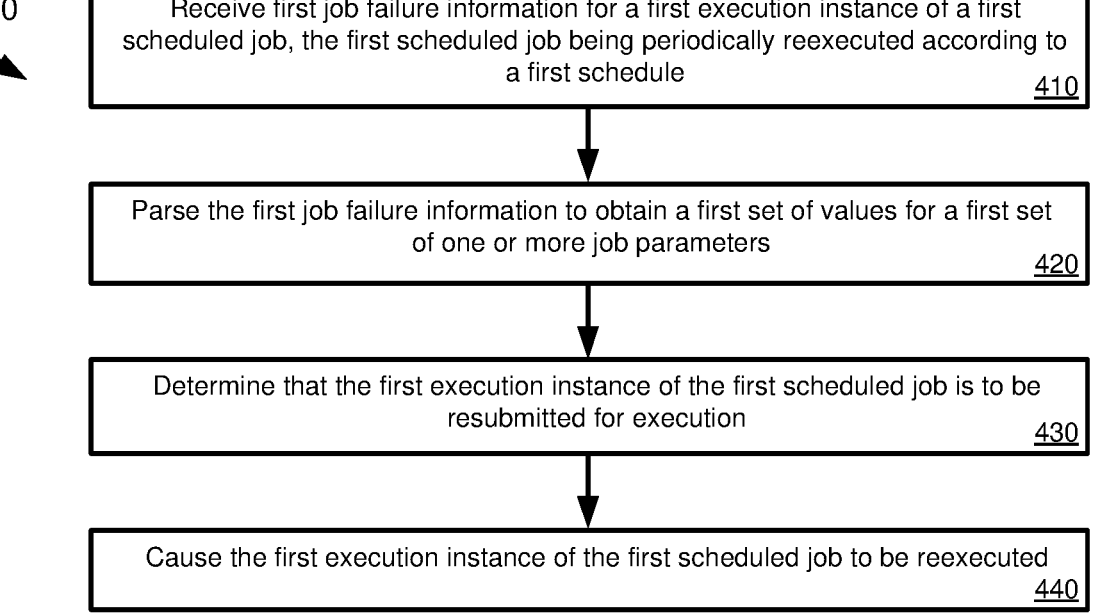

Receive first job failure information for a first execution instance of a first scheduled job, the first scheduled job being periodically reexecuted according to a first schedule     410

Parse the first job failure information to obtain a first set of values for a first set of one or more job parameters     420

Determine that the first execution instance of the first scheduled job is to be resubmitted for execution     430

Cause the first execution instance of the first scheduled job to be reexecuted     440

FIG. 4

COMPUTING ENVIRONMENT 500

COMMUNICATION CONNECTION(S) 570

INPUT DEVICE(S) 550

OUTPUT DEVICE(S) 560

STORAGE 540

530 central processing unit 510 graphics or co-processing unit 515

MEMORY 520

MEMORY 525

SOFTWARE 580 IMPLEMENTING DESCRIBED TECHNOLOGIES

600

REPORT REEXECUTION FRAMEWORK

FIELD

The present disclosure generally relates to handling of failed jobs, such as jobs to generate reports. Particular implementations relate to determining whether or how to reschedule failed jobs.

BACKGROUND

Software is a critical part of the functioning of nearly every human enterprise, whether in terms of governmental operations or private industry. In particular, many organizations operate on the assumption that defined computer implemented tasks will complete, such as according to a schedule. For example, some positions within an organization may have activities assigned to them according to reports that are run in advance of any given day. If a report is not generated as scheduled, an employee may show up for work with no tasks assigned, or at least without tasks being assigned as expected. If the employee is unable to start on their tasks, productivity may suffer. Moreover, tasks performed by one employee can influence tasks performed by other employees, and so an issue that affects the performance of tasks by one employee can cascade and multiply.

In some types of management/monitoring of computer implemented tasks, tasks can be monitored, and retried if a failure is detected. However, blind retries of failed tasks can lead to suboptimal use of computing resources. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides techniques and solutions for analyzing failed computing tasks (or "jobs") for resubmission. Computing jobs can include requests to generate recurring reports according to a schedule. Information regarding failed jobs can be submitted to a job resubmission framework. Various parameters can be extracted from the failed job information and used to determine whether a job should be submitted for reexecution. Jobs that are to be submitted for reexecution can be placed in a queue or released according to a schedule. Determining whether a job should be submitted for reexecution can include determining a relative priority of reexecuting a particular job compared with other jobs to be reexecuted. Disclosed techniques can help ensure that more important jobs are executed before lower priority jobs, as well as helping to avoid overloading a computing system with job reexecution processes.

In one aspect, the present disclosure provides a process for job reexecution. First job failure information for a first execution instance of a first scheduled job is received, the first scheduled job being periodically reexecuted according to a first schedule. The first job failure information is parsed to obtain a first set of values for a first set of one or more job parameters. It is determined that the first execution instance of the first scheduled job is to be resubmitted for execution. The first execution instance of the first scheduled job is caused to be reexecuted.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 2 illustrates example job or job failure parameters that can be used in determining whether or how to reschedule jobs, and two examples of parameters obtained from failed jobs.

FIGS. 3A and 3B illustrate example job information and job reexecution information.

FIG. 4 is a flowchart illustrating example job reexecution operations.

DETAILED DESCRIPTION

Example 1—Overview

Software is a critical part of the functioning of nearly every human enterprise, whether in terms of governmental operations or private industry. In particular, many organizations operate on the assumption that defined computer implemented tasks will complete, such as according to a schedule. For example, some positions within an organization may have activities assigned to them according to reports that are run in advance of any given day. If a report is not generated as scheduled, an employee may show up for work with no tasks assigned, or at least without tasks being assigned as expected. If the employee is unable to start on their tasks, productivity may suffer. Moreover, tasks performed by one employee can influence tasks performed by other employees, and so an issue that affects the performance of tasks by one employee can cascade and multiply.

In some types of management/monitoring of computer implemented tasks, tasks can be monitored, and retried if a failure is detected. However, blind retries of failed tasks can lead to suboptimal use of computing resources. Accordingly, room for improvement exists.

The present disclosure provides for intelligent management of failed computing processes (also referred to as jobs, tasks, or execution instances). In particular, techniques and solutions are provided for determining what jobs should be rescheduled, a schedule for retrying jobs, or prioritizing the rescheduling of jobs according to various criteria. Among other things, disclosed techniques can help provide that certain jobs are prioritized for execution, while also conserving computing resources. Consider that a job may have failed because a particular computing system or process running thereon does not have sufficient computing resources. If too many failed jobs are rescheduled, or at least too closely together, computing resources may be further strained, causing more jobs to fail.

In one aspect, the present disclosure provides for receiving information about failed jobs, such as a request for a report to be generated. The information can include information about job parameters, such as how frequently a job is scheduled to run, or a user or user group associated with the job. Various types of information can be analyzed to determine whether a job should be rescheduled, or when a job should be rescheduled, including in relation to other failed jobs. Based on the analysis, at least a portion of the jobs can be scheduled or submitted for another execution attempt.

Example 2—Example Computing Environment with Job Resubmission Framework

Figure 1:
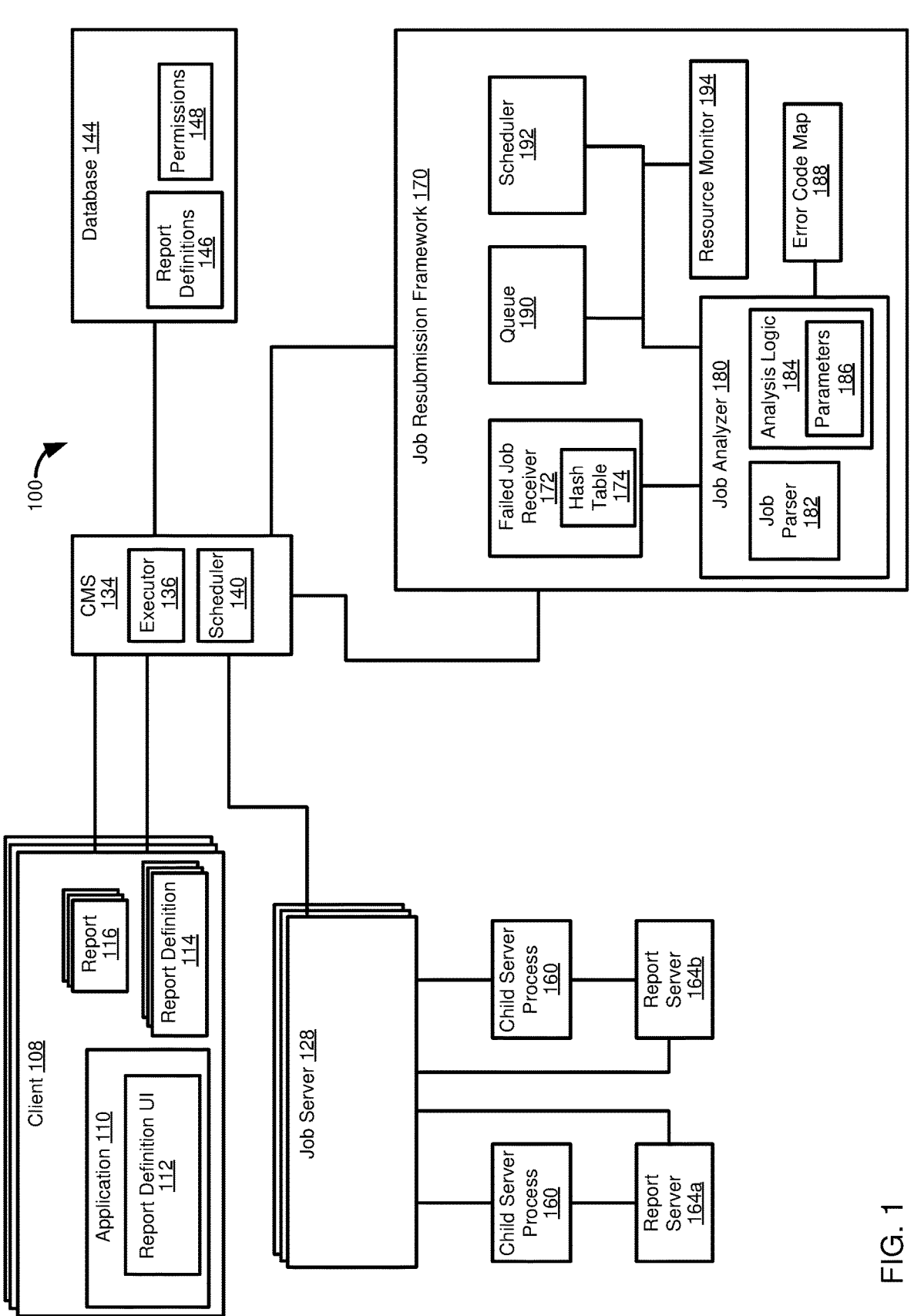
FIG. 1 is a diagram of a computing environment illustrating how a job resubmission framework can process information regarding failed jobs.

FIG. 1 illustrates a computing environment 100 in which disclosed techniques can be implemented. A client 108 can include an application 110 that presents a report definition user interface 112 that can be used to generate report definitions 114.

A report can be a request for one or more actions to be performed, such as retrieving specified data from a data source, such as a relational database or other type of database, and optionally formatting retrieved data in a particular way. A report definition 114 can define actions such as a query of database data or the retrieval of other objects, such as instances of a particular type of computing object.

A report definition 114 can be represented as one or more computing objects, where a report 116 can represent execution results of a single execution of a report definition. For example, as data maintained by an organization changes over time, the same report definition 114 may be expected to produce reports 116 having different data. Report definitions 114 can refer to (such as being dependent on, such as information included in) other report definitions or other types of objects/object instances, and so the object or objects of one report definition can refer to object instances of the same or other types of report definitions. If a report definition 114, or other type of job definition, depends on other jobs/reports, or has other dependencies, these dependencies can be specified in the report definition 114.

Execution of report definitions 114, particularly report instances, can be received by the client 108 and are shown as reports 116. Alternatively, particular reports 116 can be provided to a component other than the client 108, or can be stored in a datastore (such as a database 144) to be retrieved on demand, or "pushed" if defined conditions are satisfied.

A report definition 114 can include a template as to how retrieved data should be presented, such as for rendering by a particular application. For example, a template can specify how data should be presented with respect to particular user interface elements, such as text boxes, or can specify visualizations that can be generated and displayed based on data in a report 116 generated from a report definition 114.

A report definition 114 can include, or can otherwise be associated with, additional information. A report definition 114 can include information such as a recurrence frequency, such as whether the report should be run hourly, daily, weekly, or monthly, should be run on specified dates, or should be run on the occurrence of particular events or triggers. In one aspect, a report can be triggered to run when a predecessor report is executed, or can be triggered to run when the report serves as a predecessor report for another report to be executed.

A report definition 114 can include information specifying an application that will use a report 116, other otherwise specify a location where data for a report should be sent or stored. A report definition 114 can include information about a user or user group or class associated with the report definition. A report definition 114 can include an identifier of a priority for a report, or information that can be used to at least in part to determine a report priority. The user or user group information can be one way of at least partially determining a report priority. As an example, report definitions 114, or specific requests for a report 116 to be generated from a report definition, associated with higher management levels of an organization can have a higher priority than report definitions or report execution requests associated with users at lower management levels.

A report definition 114 can include information useable to determine where a report definition 114 should be executed to generate a report 116. That is, as will be further discussed, different types of report definitions 114 can be associated with different job servers that are responsible for generating reports 116, such as the job servers 128 shown in FIG. 1, which will be further discussed. Information in the report definition 114 regarding a job server can also be used to prioritizing or otherwise scheduling a job resubmission.

While various types of information have been described as being in a report definition 114, it should be appreciated that at least some of this information can be provided in another manner, such as in a request to prepare a report 116 according to a report definition, or during processing of a particular request. For example, a request to prepare a report 116 using a report definition 114 can be sent from the client 108 to a central management server 134. The central management server 134 can analyze the request to generate a report 116, such as to determine a report type or report identifier that can be used to determine a job server 128 that should be used in generating the report. The central management server 134 can be optional and, unless indicated otherwise, functions performed by the central management server can be performed by a job server 128, or another component of the computing environment 100.

The central management server 134 can include an executor 136. The executor 136 can receive and process requests to generate reports, or "jobs." The executor 136 can communicate with a data source, such as a database 144. The database 144 can store report definitions 146. In some implementations, the report definitions 146 can be, or can include, the report definitions 114. In further implementations, the report definitions 146 can include information associated with particular report definitions 114, such an identity of a job server 128 to be used with a job, or information sufficient to determine a priority for the job, including by retrieving information to determine a priority for the job based on a particular user identity or user class.

The database 144 can also store permissions information 148. The permissions information 148 can include information that allows the executor 136 to determine whether a particular request to execute a job or schedule a job is authorized. For example, it can be determined whether a particular user identifier for a user submitting the job to the central management server 134 is authorized to schedule a recurring job.

As part of executing a job (also referred to an execution instance of a job definition), the executor 136 can send jobs to an appropriate job server 128. The executor 136 also typically processes execution results from the job server 128. Processing execution results can include determining whether a job succeeded. Processing execution results can also include forwarding execution results, such as to a client 108, or storing the execution results, such as in the database 144 or another data store.

Aspects of the present disclosure relate to the performance of recurring jobs, such as where a report 116 is to be generated according to a report definition 114 at a specified frequency, or based on other criteria. The central management server 134 can include a scheduler 140 that can be used to determine when a job should be executed, and that can cause the executor 136 to initiate the execution of the job pursuant to the schedule.

The job servers 128 are responsible for executing jobs, or at least causing such jobs to be executed. The job servers 128 are also typically responsible for sending execution results to the central management server 134, such as to the executor 136. However, execution results can optionally be sent by a component or process downstream of the job server 128.

A job server 128 can have one or more child processes 160. In some cases, child processes can represent separate execution threads of the job server 128. Typically, a job server 128 performs multiple jobs concurrently. However, a number of concurrently executed jobs can be dynamically or statically limited. Jobs can be queued or paused if it is determined that available resources are less than a particular threshold, or if used resources exceed a particular threshold.

A given implementation of the computing environment 100 can have additional layers/components associated with job execution. For example, the computing environment 100 illustrates a report server 164*a* and a report server 164*b*. The report servers 164*a*, 164*b* can represent servers for different types of reports, or reports of a same type but for differing priorities. The report servers 164*a*, 164*b* can also represent different computing systems or components for executing reports, or different interfaces for a common computing system.

The report servers 164*a*. 164*b*, or another component responsible for obtaining a report 116 according to a report definition 114, can provide report data to the job server 128, at least in the embodiment shown. The job server 128 can then forward job execution results to the central management server 134, or another component as desired.

In other cases, the report servers 164*a*, 164*b* can return report data to another component, such as sending report data directly to the central management server 134, causing result data to be stored in the database 144, or sending result data to a client 108. Result data can include one or both of data used in generating a report 116 or errors that may have been encountered in generating the report. As described above, processing of a job can complete without errors, complete with errors, or can fail, where a failure notification can include an error code or error message that may be useable to help explain a cause of job failure. While in some cases job execution results can be sent to the same component whether a job competes without errors or if errors are encountered, in other cases information can be sent to different components depending on an outcome of executing, or attempting to execute, a particular job.

The central management server 134 receives job execution results. If a job completes, with or without errors, the central management server 134 can forward job execution results to a client 108, such as a report 116 or as information useable to produce such a report. Alternatively, the central management server 134 can take other or additional actions, such as causing execution results to be stored in the database 144. In cases where a job completed with errors or did not complete, job failure information can be submitted to a job resubmission framework 170. Optionally, the job failure information can be sent to another component of the computing environment 100, such as a client 108. Although the job resubmission framework 170 is shown as a separate component in the computing environment 100, it can be incorporated into other components, such as a client 108 or being included as part of the central management server 134.

Information regarding failed jobs can be received by a failed job receiver 172. The failed job receiver 172 can be used to produce a unique identifier for failed jobs. For example, different jobs can have identifiers or content that are in different formats, and so it may be cumbersome to process a diverse set of job failure information. In a particular implementation, the failed job receiver 172 can apply a hash function to job failure information to produce a hash value, which can then be stored in a hash table 174. Failed jobs can then be processed by other components of the job resubmission framework 170 using the hash value, and the hash table 174 can be accessed as needed, such if a job resubmission request is provided to the central management server 134 or another component of the computing environment 100.

Job failure information, including the identifier assigned by the job receiver 172, can be sent to a job analyzer 180. The job analyzer 180 can perform functions such as extracting job data from the job failure information. The job failure information can be used to determine whether a failed job should be resubmitted for execution. The extracted job failure information can also be used to determine when or how a job should be resubmitted for execution.

More specifically, the job analyzer 180 can include a job parser 182 that extracts particular data from the job failure information. The information that can be extracted and used in resubmission analysis will be further described. However, it should be noted that at least some of the information used in such analysis can be obtained from other sources. That is, a job failure message provided by a job server 128 can provide some useful information, but may not provide all information that is to be used with a particular implementation of analysis logic 184 of the job analyzer 180. In some cases, this information can be obtained by the central management server 134 and included in job failure information provided to the job resubmission framework 170. In other cases, the job parser 182 can determine needed information that is not included in the job failure information and retrieve the information from another source, such as from the central management server 134 or the database 144.

The job parser 182 can include programming that includes functions for extracting data from different types of job failure information, such information from different job servers 128, or where particular types of jobs include different information or include information in different formats, even if the information is of a common type. In other scenarios, this functionality is performed by the central management server 134, and the job failure information is provided in a format that the job parser 182 is configured to use, such as providing job failure information in a particular XML or JSON structure.

The analysis logic 184 uses various types of job failure information to determine whether, or how, a job should be resubmitted. The analysis logic 184 can be the same for all types of jobs, or different logic can be specified for different jobs. In particular, it may be desirable to have different analysis logic 184 if different jobs include different types of job failure information, or a common analysis logic 184 can account for the presence or absence of certain job failure data, such as particular parameters 186 used by the analysis logic 184.

Parameters 186 that can be analyzed by the analysis logic 184 include a recurrence frequency, a time of failure, a next scheduled job execution, a destination of a job request (such as a particular job server 128 or components associated therewith, such as a child server process 160 or a report server 164a. 164b, or a particular destination for execution results), a tenant or other source of a job, information about jobs depending on the failed job (or, in some cases, a job on which the failed job depends), or error codes or other error information encountered during job failure.

The parameters 186 can be used in the analysis in different ways, which can depend on the nature of a particular job or otherwise as tailored to a specific scenario. For the recurrence frequency, jobs that occur more frequently or less frequently can in some cases be correlated to the importance of a job. For example, a job that runs hourly may be indicated as having comparatively higher importance than a job that is run weekly. The recurrence frequency parameter 186 can be balanced against other parameters. For example, while a job that runs hourly may have a comparatively higher importance, if a time between job failure and scheduled job reexecution is short, the analysis logic 184 may determine that the job should not be rescheduled, or assigned a lower priority.

As another example of how recurrence frequency can be balanced with other parameters 186, a job that is executed less frequently may be considered as lower priority based solely on that parameter, but if the job has a larger number of dependent jobs, particularly jobs of high frequency or otherwise indicated as high importance, the lower recurrence frequency job may be assigned a comparatively higher priority.

The failure time parameter 186 can also be used in different ways, including with a parameter indicating a next scheduled execution time, or with the parameter indicating dependent jobs. In some cases, a longer passage of time since a failure time can be weighed in favor of job resubmission, or prioritizing the job more highly for resubmission. However, if the job is scheduled to be reexecuted relatively quickly (such as evaluated against a particular threshold value), the job may be assigned a lower priority or not marked for resubmission. The failure time parameter 186 can also be used to help determine when a job should be resubmitted, which can be made in conjunction with error information, such as particular error codes provided in the job failure information, or other information (such as a particular error message captured during job failure). For example, assume that an error code indicates that available resources were exceeded and so a corresponding job was terminated or not submitted for execution. Such an error code may indicate that it may be beneficial to reschedule or otherwise resubmit a job after a delay period such that resources needed to execute the job may be available.

Concerning error codes used as parameters, in some cases an error code map 188 can be provided. The error code map 188 can correlate particular error codes with particular failure modes, where some failure modes can be common across job types, but associated with different error code values. Failure modes can be represented by an error type that is then used as part of the analysis logic 184. Examples of error codes/failure modes include, as discussed, unavailability of a job server 128 or other job execution component.

In general, error codes can be used to determine where an error occurred, such a particular execution component that encountered the error, and/or an identification of why the error occurred. For example, the same error could occur on different execution components, or a single execution component could encounter multiple types of errors. In some cases, documentation associated with a particular software component can include information about error codes that might be encountered, such as what the error code represents, and optionally information regarding action that can be taken to address the error.

In software available from SAP SE of Walldorf, Germany, an error code that can be encountered is "login error. [CrystalEnterprise.Smtp]:[SMPT Server does not support [login] authentication protocol. Return Code: [SMTEP 53—Authentication required.].]. The error code can indicate a problem with SMPT configuration. If the error is encountered, an alert can be provided to a user to address the error, or configuration setting can be analyzed and automatically updated.

As another example, software available from SAP SE can include an error code: Job error log contains information; "CON-120505. Initialization Sybase connection error: <Sybase CS Library message number <101188867> Severity <5>: Message Text is: ct_connect( ): directory service layer control layer error: Requested server name not found.>". This error can indicate a failure in a database connection. In some cases, a job can be rescheduled to determine if a connection with the database can be established, such as there was an error with the database software/a network error. Or, the error code can be provided to a user, or remedial action can automatically be taken, such as checking connection parameters in a job with configuration settings for the database, which can be maintained by the central management server 134. Note that in this case the error code has a severity value of 5. If error codes have severity levels, in some cases these levels can be taken into account when deciding if, or when, to try job reexecution. For example, a longer delay may be provided for reexecuting jobs with higher severity levels.

Additional examples of error codes, which can be found in software available from SAP SE, include:

1) Failed to schedule a multilingual report. (CRS 300022)
2) Failed to trigger alert within the report. (CRS 300023)
3) Empty global delivery rule expression specified. Did you properly configure your publication? (FBE42017)
4) Unable to find the last processed recipient {0} in the data provider's data. If the database changed since the last run, please reschedule the publication. (FBE42048)
5) The post-distribution plugin with class {0} failed to execute. Did you configure your plugin properly? (FBE42049)
6) Unable to schedule document with id {0} for publication with id {1} due to insufficient access rights to the source document. (FBE42056)
7) Failed to schedule the global delivery rule document with ID {0}: {1} (FBE 60105)
8) Waiting for global delivery rule job to complete. Job ID: %1, name: %2, kind: %3 in %4 state (FBE 60107)
9) Unable to query global delivery document with ID {0}. (FBE 60106)
10) An error occurred while retrieving the URLs for Properties/Schedule/History Action (MON00004)

A destination parameter 186, depending on implementation, can represent a destination for a report or a destination in terms of a job server 128 or other job execution component. If desired, separate parameters 186 can be provided for both of these options. In the case of destination as where a report 116 or data for a report is to be sent, a destination can represent a particular user, user group, software application, computing system, or other destination. Different destinations can be associated with different priorities. For example, a job with a destination of an administrator group can be given a higher priority than a job for an end user group, even if other job parameters, or job failure information, is otherwise comparable. The analysis logic 184 can store values that associate different destinations with specific priorities, or information useable to help establish a priority.

A tenant parameter 186 can be used in a similar manner as the destination parameter. For example, a computing system or portion thereof may have a particular workspace that is reserved for high-level executives. Jobs associated with different tenants can thus also be associated with different priorities, or information useable to help establish differing priorities. In addition to, or instead of, being used to determine a priority, the destination or tenant parameters 186 can be used to determine whether a job should be rescheduled. A job originating from a tenant for high-level executives can be prioritized for resubmission even if the job would naturally be executed again according to a schedule within a relatively short period of time, and under those conditions the job would not be rescheduled if it was associated with a different tenant.

A parameter 186 representing dependent jobs has already been discussed in relation to other parameters. Generally, a failed job on which other jobs depend can be given a higher priority for resubmission, or identified for resubmission, where a job with no dependent jobs might not be rescheduled or given a lower priority. If desired, more granular analysis of dependent jobs can be performed, such as analyzing a number of dependent jobs, a schedule at which dependent jobs are set to be executed (where, for instance, a job might be prioritized for resubmission if an execution of a dependent job is imminent), or priorities associated with dependent jobs (which, in general, can consider other parameters of the parameters 186 discussed above, but for the dependent jobs rather than the failed job).

An outcome of the analysis logic 180 can be that a job is not rescheduled, a job is immediately rescheduled, is placed in a queue 190 for reexecution (such as a priority queue), or is scheduled for resubmission using a scheduler 192. A job might be assigned to the scheduler 192 rather than being placed in the queue 190, for example, if a job server 128 had crashed or had insufficient resources to execute the job, as the placement in the queue 190 might be likely to result in job failure because the job server still had insufficient resources if the job is resubmitted too soon.

In that regard, the scheduler 192, or the analysis logic 184, can access a resource monitor 194. In one example, the resource monitor 194 can directly monitor resources of various job execution components, such as the job servers 128, or can obtain the information elsewhere, such as from the central management server 134. The resource monitor 194 can determine information such as whether a particular job execution component, such as a job server 128 is available, or an amount of resources available at the job execution component. An amount of available resources can be measured in terms of available or used computing resources, such as processor use or memory, or can reflect a number of pending jobs or average job execution time. The information from the resource monitor can be used by the queue 190 or the scheduler 192. For example, an item may be removed from the queue 190 once it has been determined that a job execution component needed for the queued job has sufficient resources available to execute the job.

In this regard, the queue 190 can be a "unified" queue for all jobs, or different queues can be created, such as for different job types or job execution components, or based on other parameters, which can include parameters of the parameters 186. For example, assuming that a parameter 186 indicates a destination computing system for such a report 116 or information useable in generating a report, separate queues 190 could be maintained for different destination systems, or a unified queue could consider this information in selecting a job to remove from the queue.

Similarly, the scheduler 192 can use criteria such as "resubmit job when resource use of job server is below X threshold." or "resubmit job when queue of job sever is less than X % full." Information from the resource monitor 194, or from values of the error code parameters (or other error code information, such as a failure not associated with a specific error code), can also be used in establishing criteria for the scheduler 192 to use in determining a schedule for resubmitting jobs, or this assignment can be made by the analysis logic 184.

Consider that a job failed because a job server 128 crashed. The analysis logic 184 or the scheduler 192 can use this information to determine how long to wait before a job is resubmitted, where this analysis can also account for values of the parameters 186. Other values for the error code parameter 186 can be associated with different delays before a job is rescheduled.

In some cases, when a job is released from the queue 190 or the scheduler 192, is it provided to the central management server 134, which can resubmit the job for execution in a similar manner as for new jobs submitted by the clients 108. In other implementations, jobs can be submitted directly by the job resubmission framework 170 to a job execution component, without sending the job request to the central management server 134.

Example 3—Example Failed Job Parameters and Example Failed Job Information

FIG. 2 illustrates a table 200 of parameters 210 (shown as 210*a*-210*g*) that can be used in determining whether a job should be resubmitted for execution, or in prioritizing execution of jobs, as well as rankings 214 assigned to such parameters. The parameters of the table 200 can correspond to the parameters 186 of FIG. 1, including a parameter 210*a* for a job recurrence frequency, a parameter 210*b* indicating a time of failure, a parameter 210*c* indicating a next scheduled execution time, a parameter 210*d* indicating a destination (which can be a destination of a job or a destination of job execution results), a parameter 210*e* identifying a tenant associated with a job (which can be a tenant who originated a job execution request or who is to receive job execution results), a parameter 210*f* identifying dependent jobs, and a parameter 210*g* indicating any error codes or error messages provided with job failure data.

The parameters 210 of the table 200 can be adjusted as desired. For example, not all implementations need to use all parameters, either as part of analysis logic generally or for particular job types. Similarly, parameters not included in the table 200 can be used without departing from the scope of the present disclosure.

Regarding the rankings 214, they can represent a relative importance of the parameters 210. The rankings 214 also be adjusted for particular implementations, including for particular job types. In some cases, rankings 214 can be considered as being in importance tiers, such as where parameters 210*a*-210*c* are part of a highest ranked tier, parameters 210*d*-210*f* are part of an intermediate tier, and parameter 210*g* is part of a lowest ranked tier.

Parameters 210 within a given tier can be weighted relative to one another, such as having logic where weighted combinations of parameters in different tiers are considered. In some cases, for example, a weighting of parameters 210*d*-210*f* could determine at least in part an overall scheduling outcome. Considered another way, parameters 210 in lower tiers can help refine a ranking order produced using parameters in higher tiers.

FIG. 2 also illustrates examples of parameters and corresponding values for two failed jobs 240, 260. Job 240 reaches a job rescheduling framework (such as the job rescheduling framework 170 of FIG. 1) first, as it failed fifteen minutes earlier than the job 260.

Consider now that the job rescheduling framework compares when to reschedule jobs 240 and 260 relative to one another. That is, when a newly failed job is being analyzed, it can be considered relative to other jobs that already queued or scheduled for execution, as a later failed job can have a high priority than earlier failed jobs.

For the parameters 210a-210c, job 260 could be assigned a higher priority because its recurrence duration, value for parameter 210a, is shorter than that of job 240, which can indicate that the document is frequently updated, indicating the importance of the associated report (such as a report 116 of FIG. 1).

Now parameters 210d-210f can be considered. Values for parameter 210f indicate that job 240 has no dependent jobs, while job 260 has dependent jobs. This parameter can thus also indicate that job 260 should be scheduled before job 240, even though job 240 failed earlier than job 260.

Example 4—Example Job and Job Re-Execution Information

FIGS. 3A and 3B illustrate example job information and job reexecution information for example jobs. For job information 300 of FIG. 3A, the error code indicates that a particular file system destination is not approved for writing, and so the job would not be expected to succeed regardless of the number of times it is retried. Accordingly, in this case the job is not rescheduled for execution, and instead an alert is provided to an administrator. Job reexecution information 320 indicates that no retries are allowed.

In FIG. 3B, job information 350 indicates that an error is related to a network layer of a database that processes the job. In this case, the job may succeed if retried. Job reexecution information 370 indicates that two retries are allowed.

Example 5—Example Job Reexecution Operations

FIG. 4 is a flowchart of a process 400 for job reexecution. In particular implementations, the process 400 can be performed in the computing environment of FIG. 1.

At 410, first job failure information for a first execution instance of a first scheduled job is received, the first scheduled job being periodically reexecuted according to a first schedule. The first job failure information is parsed at 420 to obtain a first set of values for a first set of one or more job parameters. It is determined at 430 that the first execution instance of the first scheduled job is to be resubmitted for execution. At 440, the first execution instance of the first scheduled job is caused to be reexecuted.

Example 6—Computing Systems

FIG. 4 depicts a generalized example of a suitable computing system 400 in which the described innovations may be implemented. The computing system 400 is not intended to suggest any limitation as to scope of use or functionality of the present disclosure, as the innovations may be implemented in diverse general-purpose or special-purpose computing systems.

With reference to FIG. 4, the computing system 400 includes one or more processing units 410, 415 and memory 420, 425. In FIG. 4, this basic configuration 430 is included within a dashed line. The processing units 410, 415 execute computer-executable instructions, such as for implementing components of the processes of the present disclosure. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 4 shows a central processing unit 410 as well as a graphics processing unit or co-processing unit 415. The tangible memory 420, 425 may be volatile memory (e.g., registers, cache, RAM), nonvolatile memory (e.g., ROM, EEPROM, flash memory, etc.), or some combination of the two, accessible by the processing unit(s) 410, 415. The memory 420, 425 stores software 480 implementing one or more innovations described herein, in the form of computer-executable instructions suitable for execution by the processing unit(s) 410, 415. The memory 420, 425, may also store settings or settings characteristics, databases, data sets, interfaces, displays, object instances, or model.

A computing system 400 may have additional features. For example, the computing system 400 includes storage 440, one or more input devices 450, one or more output devices 460, and one or more communication connections 470. An interconnection mechanism (not shown) such as a bus, controller, or network interconnects the components of the computing system 400. Typically, operating system software (not shown) provides an operating environment for other software executing in the computing system 400, and coordinates activities of the components of the computing system 400.

The tangible storage 440 may be removable or non-removable, and includes magnetic disks, magnetic tapes or cassettes, CD-ROMs, DVDs, or any other medium which can be used to store information in a non-transitory way, and which can be accessed within the computing system 400. The storage 440 stores instructions for the software 480 implementing one or more innovations described herein.

The input device(s) 450 may be a touch input device such as a keyboard, mouse, pen, or trackball, a voice input device, a scanning device, or another device that provides input to the computing system 400. The output device(s) 460 may be a display, printer, speaker, CD-writer, or another device that provides output from the computing system 400.

The communication connection(s) 470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 7—Cloud Computing Environment

Figure 5:
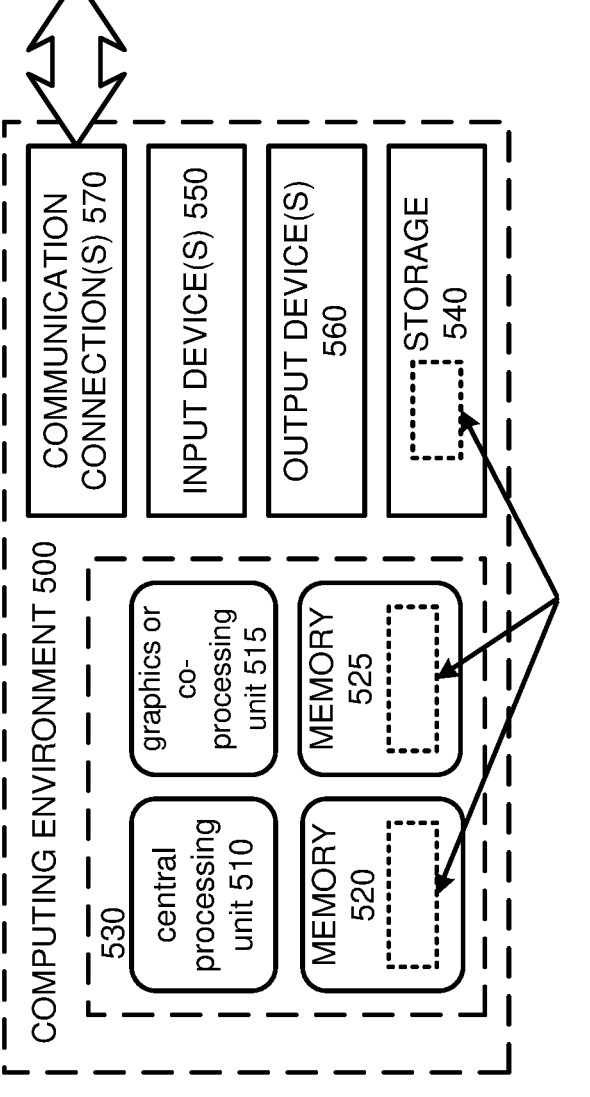
FIG. 5 is a diagram of an example computing system in which some described embodiments can be implemented.
Figure 6:
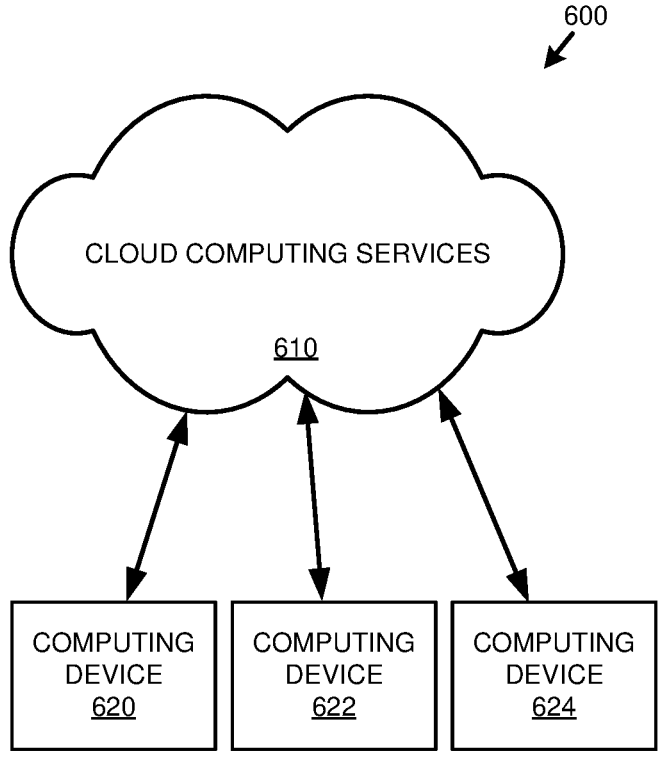
FIG. 6 is an example cloud computing environment that can be used in conjunction with the technologies described herein.

FIG. 5 depicts an example cloud computing environment 500 in which the described technologies can be implemented. The cloud computing environment 500 comprises cloud computing services 510. The cloud computing services 510 can comprise various types of cloud computing resources, such as computer servers, data storage repositories, networking resources, etc. The cloud computing services 510 can be centrally located (e.g., provided by a data center of a business or organization) or distributed (e.g., provided by various computing resources located at different locations, such as different data centers and/or located in different cities or countries).

The cloud computing services 510 are utilized by various types of computing devices (e.g., client computing devices), such as computing devices 520, 522, and 524. For example, the computing devices (e.g., 520, 522, and 524) can be computers (e.g., desktop or laptop computers), mobile devices (e.g., tablet computers or smart phones), or other types of computing devices. For example, the computing devices (e.g., 520, 522, and 524) can utilize the cloud computing services 510 to perform computing operations (e.g., data processing, data storage, and the like).

Example 8—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 4, computer-readable storage media include memory 420 and 425, and storage 440. The term computer-readable storage media does not include signals and carrier waves. In addition, the term computer-readable storage media does not include communication connections (e.g., 470).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one hardware processor;
at least one memory coupled to the at least one hardware processor; and
one or more computer-readable storage media storing computer-executable instructions that, when executed, cause the computing system to perform operations comprising:
receiving first job failure information for a first execution instance of a first scheduled job, the first scheduled job being periodically reexecuted according to a first schedule, the job failure information comprising structured error data;
parsing the structured error data of the first job failure information to obtain a first set of values for a first set of one or more job parameters, the first set of job parameters including at least an error code comprising a machine-generated code or message emitted by a job execution component that identifies a failure mode of the first execution instance;
determining, prior to a next scheduled execution of the first scheduled job, that the first execution instance of the first scheduled job is to be resubmitted for execution, and responsive thereto, issuing a resubmission instruction to a job execution component, the determining being based at least in part on the error code and on one or more of:
a downstream job dependency, including parsing the job failure information to identify one or more jobs dependent on the failed job and prioritizing resubmission of the failed job to enable execution of the dependent jobs;
a tenant associated with the job, including extracting a tenant identifier from the job failure information and evaluating a workload of the tenant to adjust timing or prioritization of resubmission of the first execution instance; or
an availability of computing resources, including detecting from the error code a resource exhaustion condition and monitoring current resource usage of the job server to determine a threshold level below which the first execution instance is to be resubmitted; and
causing, by issuing the resubmission instruction to a job execution component, the first execution instance of the first scheduled job to be reexecuted, wherein the job execution component reexecutes the first execution instance responsive to the resubmission instruction.

2. The computing system of claim 1, wherein the first set of one or more job parameters comprises a job failure time.

3. The computing system of claim 1, wherein the first set of one or more job parameters comprises a recurrence frequency of the first scheduled job.

4. The computing system of claim 1, wherein the first set of one or more job parameters comprises a time the first scheduled job will be next executed.

5. The computing system of claim 1, wherein the first set of one or more job parameters comprises a destination specified for the first scheduled job.

6. The computing system of claim 5, wherein the destination specifies a job execution component used in executing the first instance of the first scheduled job.

7. The computing system of claim 5, wherein the destination specifies a location to which job execution results will be sent.

8. The computing system of claim 1, wherein the first set of one or more job parameters comprises a tenant from which the first scheduled job originated.

9. The computing system of claim 1, wherein the first set of one or more job parameters comprises an indication of any jobs depending on the first scheduled job.

10. The computing system of claim 1, the operations further comprising:
determining an execution priority for reexecuting the first execution instance of the first scheduled job.

11. The computing system of claim 10, the operations further comprising:
enqueuing the first execution instance of the first scheduled job in a priority queue based at least in part on the execution priority.

12. The computing system of claim 10, wherein the determining an execution priority comprises analyzing a plurality of job parameters of the first set of one or more job parameters.

13. The computing system of claim 1, the operations further comprising:
determining a reexecution time for reexecuting the first execution instance of the first scheduled job; and
scheduling the first executing instance of the first scheduled job at the reexecution time.

14. The computing system of claim 13, wherein the determining a reexecution time comprises analyzing a plurality of job parameters of the first set of one or more job parameters.

15. The computing system of claim 13, wherein the determining that the first execution instance of the first scheduled job is to be resubmitted for execution is based at least in part on the availability of computing resources, including the detecting from the error code a resource exhaustion condition and monitoring current resource usage of the job server to determine a threshold level below which the first execution instance is to be resubmitted.

16. The computing system of claim 1, the operations further comprising:
receiving second job failure information for a first execution instance of a second scheduled job, wherein the first execution instance of the second scheduled job is a second instance of the first scheduled job or is a first execution instance of a scheduled job other than the first scheduled job; and
determining that the second execution instance of the second scheduled job is not to be reexecuted.

17. The computing system of claim 16, the operations further comprising:
sending a job failure alert in response to the determining that the second execution instance of the second scheduled job is not to be reexecuted.

18. The method of claim 1, further comprising:

determining an execution priority for reexecuting the first execution instance of the first scheduled job, wherein the determining an execution priority comprises analyzing a plurality of job parameters of the first set of one or more job parameters.

19. A method, implemented in a computing system comprising at least one hardware processor and at least one memory coupled to the at least one hardware processor, the method comprising:

receiving first job failure information for a first execution instance of a first scheduled job, the first scheduled job being periodically reexecuted according to a first schedule, the job failure information comprising structured error data;

parsing the structured error data of the first job failure information to obtain a first set of values for a first set of one or more job parameters, the first set of job parameters including at least an error code comprising a machine-generated code or message emitted by a job execution component that identifies a failure mode of the first execution instance;

determining, prior to a next scheduled execution of the first scheduled job, that the first execution instance of the first scheduled job is to be resubmitted for execution, and responsive thereto, issuing a resubmission instruction to a job execution component, the determining being based at least in part on the error code and on one or more of:

a downstream job dependency, including parsing the job failure information to identify one or more jobs dependent on the failed job and prioritizing resubmission of the failed job to enable execution of the dependent jobs;

a tenant associated with the job, including extracting a tenant identifier from the job failure information and evaluating a workload of the tenant to adjust timing or prioritization of resubmission of the first execution instance; or an availability of computing resources, including detecting from the error code a resource exhaustion condition and monitoring current resource usage of the job server to determine a threshold level below which the first execution instance is to be resubmitted; and causing, by issuing the resubmission instruction to a job execution component, the first execution instance of the first scheduled job to be reexecuted, wherein the job execution component reexecutes the first execution instance responsive to the resubmission instruction.

20. One or more non-transitory computer-readable storage media comprising:

computer-executable instructions that, when executed by a computing system comprising at least one hardware processor and at least one memory coupled to the at least one hardware processor, cause the computing system to receive first job failure information for a first execution instance of a first scheduled job, the first scheduled job being periodically reexecuted according to a first schedule, the job failure information comprising structured error data;

computer-executable instructions that, when executed by the computing system, cause the computing system to parse the structured error data of the first job failure information to obtain a first set of values for a first set of one or more job parameters, the first set of job parameters including at least an error code comprising a machine-generated code or message emitted by a job execution component that identifies a failure mode of the first execution instance;

computer-executable instructions that, when executed by the computing system, cause the computing system to determine, prior to a next scheduled execution of the first scheduled job, that the first execution instance of the first scheduled job is to be resubmitted for execution, and responsive thereto, issuing a resubmission instruction to a job execution component, the determining being based at least in part on the error code and on one or more of:

a downstream job dependency, including parsing the job failure information to identify one or more jobs dependent on the failed job and prioritizing resubmission of the failed job to enable execution of the dependent jobs;

a tenant associated with the job, including extracting a tenant identifier from the job failure information and evaluating a workload of the tenant to adjust timing or prioritization of resubmission of the first execution instance; or an availability of computing resources, including detecting from the error code a resource exhaustion condition and monitoring current resource usage of the job server to determine a threshold level below which the first execution instance is to be resubmitted; and computer-executable instructions that, when executed by the computing system, cause the computing system to cause, by issuing the resubmission instruction to a job execution component, the first execution instance of the first scheduled job to be reexecuted, wherein the job execution component reexecutes the first execution instance responsive to the resubmission instruction.

* * * * *